US008977003B1

(12) United States Patent (10) Patent No.: US 8,977,003 B1
Kwan et al. (45) Date of Patent: Mar. 10, 2015

(54) DETECTING OBJECTS IN A SEQUENCE OF IMAGES

(75) Inventors: Gavan Kwan, Mountain View, CA (US); Rushabh Ashok Doshi, Menlo Park, CA (US); Federico Javier Lebrón, Buenos Aires (AR)

(73) Assignee: Google Inc., Mountain View, CA (US)

( * ) Notice: Subject to any disclaimer, the term of this patent is extended or adjusted under 35 U.S.C. 154(b) by 223 days.

(21) Appl. No.: 13/551,469

(22) Filed: Jul. 17, 2012

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

| | | | | |
|---|---|---|---|---|
| 6,301,370 | B1 | 10/2001 | Steffens et al. | |
| 6,724,915 | B1* | 4/2004 | Toklu et al. | 382/103 |
| 2003/0108240 | A1* | 6/2003 | Gutta et al. | 382/181 |
| 2009/0031381 | A1* | 1/2009 | Cohen et al. | 725/115 |
| 2009/0041310 | A1* | 2/2009 | Yang et al. | 382/118 |
| 2009/0148058 | A1* | 6/2009 | Dane et al. | 382/251 |
| 2009/0185745 | A1 | 7/2009 | Momosaki | |
| 2009/0262987 | A1* | 10/2009 | Ioffe et al. | 382/118 |
| 2010/0054536 | A1* | 3/2010 | Huang et al. | 382/103 |
| 2010/0296705 | A1* | 11/2010 | Miksa et al. | 382/106 |
| 2011/0142289 | A1* | 6/2011 | Barenbrug et al. | 382/107 |

OTHER PUBLICATIONS

Benfold, B. and Reid, I., Stable Multi-Target Tracking in Real-Time Surveillance Video, Jun. 20-25, 2011, IEEE Conference on Computer Vision and Pattern Recognition, pp. 3457-3464.*
Agrawal, P. and Narayanan, P.J., Person De-Identification in Videos, Mar. 2011, IEEE Transactions on Circuits and Systems for Video Technology, vol. 21, No. 3, pp. 299-310.*
Kong, J., Ganev, I., Schwan, K., Widener, P., CameraCast: Flexible Access to Remote Video Sensors, 2007, Multimedia Computing and Networking, vol. 6504, pp. 1-12.*
Cucchiara, R., Grana, C., Prati. A., and Vezzani, R., Computer Vision Techniques for PDA Accessibility of In-House Video Surveillance, 2003, IWVS' 03, pp. 87-97.*
Senior, A., Pankanti, S., Hampapur, A., Brown, L, Tian, Y, and Ekin, A., Blinkering Surveillance: Enabling Video Privacy through Computer Vision, IBM Research Report, pp. 1-14.*
"Open Source Computer Vision Library," Jun. 22, 2008, captured Jul. 10, 2012 at http://web.archive.org/web/20080622022928/http://www.intel.com/technology/computing/opencv/.
Pittsburgh Pattern Recognition "Face Tracking", May 6, 2010, captured Jul. 10, 2012 at http://web.archive/org/web/20100506081616/http://www.pittpatt.com/face_tracking.
Frome, Andrea, "Street View revisits Manhattan", Google Lat Long Blog May 12, 2008, captured Jul. 9, 2012 at http://web.archive.org/web/20080514090502/http://google-latlong.blogspot.com/2005/05/street-view-revisits-manhattan.html.
Kim, Minyoung, et al., "Face Tracking and Recognition with Visual Constraints in Real-World Videos", IEEE Conference on Computer Vision and Pattern Recognition, pp. 1-8, 2008.
Spindler et al. "Privacy in Video Surveilled Areas", 2006, Proceedings of the 2006 International Conference on Privacy, Security and Trust: Bridge the Gap Between PST Technologies and Business Services, pp. 1-10.
USPTO, Office Action for U.S. Appl. No. 13/759,855, mailed May 12, 2014.

* cited by examiner

*Primary Examiner* — Stephen R Koziol
*Assistant Examiner* — Jonathan S Lee
(74) *Attorney, Agent, or Firm* — Lowenstein Sandler LLP

(57) ABSTRACT

The subject matter of this specification can be implemented in, among other things, a computer-implemented method for object detection. The method includes detecting at least one initial position of an object of a specific type in at least one initial image within an ordered sequence of images stored in a memory. The method further includes detecting at least one subsequent position of the object in at least one subsequent image within the ordered sequence of images. The method further includes estimating one or more intermediate positions of the object in one or more intermediate images within the ordered sequence of images between the initial image and the subsequent image based on the initial position and the subsequent position.

24 Claims, 4 Drawing Sheets

DETECTING OBJECTS IN A SEQUENCE OF IMAGES

TECHNICAL FIELD

This instant specification relates to detecting one or more objects in a sequence of images.

BACKGROUND

Object detection has been employed to identify the position and size of human faces in digital images. Face detection is a specific type of object detection. Other types of object detection can include, for example, people and vehicles. Face detection algorithms often divide each image into individual features. The features are then classified as being a face or part of a face based on a comparison to a database of facial features. For example, the database of facial features may include data that represents typical images of eyes, noses, and mouths.

Once detected, a computing system can then perform operations on the faces in the images. For example, the computing system can copy a face and place the copied face onto a new background image. In another example, the computing system can blur a face of a person in an image to protect the identity of the person.

SUMMARY

In one aspect, a computer-implemented method for object detection includes detecting at least one initial position of an object of a specific type in at least one initial image within an ordered sequence of images stored in a memory. The method further includes detecting at least one subsequent position of the object in at least one subsequent image within the ordered sequence of images. The method further includes estimating one or more intermediate positions of the object in one or more intermediate images within the ordered sequence of images between the initial image and the subsequent image based on the initial position and the subsequent position.

Implementations can include any, all, or none of the following features. Estimating the intermediate positions can include calculating a linear interpolation of the intermediate positions between the initial position and the subsequent position. The method can include blurring the object at the initial position in the initial image, the intermediate positions in the intermediate images, and the subsequent position in the subsequent image. Blurring the object can include lowering a resolution of the object at the initial position in the initial image, the intermediate positions in the intermediate images, and the subsequent position in the subsequent image. The method can include determining that the intermediate images include a number of images that is within a threshold number of images and, in response, estimating the intermediate positions. The threshold number of images can be based on a threshold amount of time. The ordered sequence of images can be a video. The method can include buffering the video for at least the threshold amount of time. The method can include providing the video for presentation with the object blurred. Blurring the object can include blurring the object in real-time with a delay due to buffering the video for at least the threshold amount of time. The method can include estimating one or more additional positions of the object in one or more additional images within the ordered sequence of images. The additional images can be at one or more of before the initial image and after the subsequent image. The additional positions of the object in ones of the additional images before the initial image can be based at least on the initial position and the additional positions of the object in ones of the additional images after the subsequent image can be based at least on the subsequent position. The ones of the additional images before the initial image and the ones of the additional images after the subsequent image can include up to a threshold number of images. The threshold number of images can be based on a threshold amount of time. Detecting the initial position, detecting the subsequent position, and estimating the intermediate positions can be performed by a server computing system. Detecting the initial position, detecting the subsequent position, and estimating the intermediate positions can be performed by a client computing device.

In one aspect, a computer-implemented system for object detection includes one or more interfaces that receive an ordered sequence of images. The system further includes a data storage that stores the received ordered sequence of images. The system further includes an object detection module that detects positions of instances of objects of a specific type within the ordered sequence of images. The system further includes an object clustering module that clusters at least a first set of the instances for a first one of the objects. The first set includes at least one initial instance at an initial position within at least one initial image from the ordered sequence of images and at least one subsequent instance at a subsequent position within at least one subsequent image after the initial image in the ordered sequence of images. The system further includes an object estimation module that estimates one or more intermediate positions of the first one of the objects within one or more intermediate images between the initial image and the subsequent image in the ordered sequence of images based on the initial position and the subsequent position.

Implementations can include any, all, or none of the following features. The object estimation module can estimate the intermediate positions by calculating a linear interpolation of the intermediate positions between the initial position and the subsequent position. The system can include an object blurring module that blurs the first one of the objects at the initial position in the initial image, the intermediate positions in the intermediate images, and the subsequent position in the subsequent image. The object blurring module can blur the first one of the objects by lowering a resolution of the first one of the objects at the initial position in the initial image, the intermediate positions in the intermediate images, and the subsequent position in the subsequent image. The object estimation module can determine that the intermediate images include a number of images that is within a threshold number of images and, in response, estimates the intermediate positions. The threshold number of images can be based on a threshold amount of time. The ordered sequence of images can be a video. The interfaces can buffer the video for at least the threshold amount of time and provide the video for presentation with the first one of the objects blurred. The object blurring module can blur the first one of the objects by blurring the object in real-time with a delay due to buffering the video for at least the threshold amount of time. The object estimation module can estimate one or more additional positions of the first one of the objects in one or more additional images within the ordered sequence of images. The additional images can be at one or more of before the initial image and after the subsequent image. The additional positions of the first one of the objects in ones of the additional images before the initial image can be based at least on the initial position and the additional positions of the first one of the objects in ones of the additional images after the subsequent image can be based at least on the subsequent position. The ones of the additional images before the initial image and the ones of the additional images after the subsequent image can include up to a threshold number of images. The threshold number of images can be based on a threshold amount of time.

In one aspect, a non-transitory computer readable storage medium has instructions that, when executed by a processing device, cause the processing device to perform operations for object detection that include detecting at least one initial position of an object of a specific type in at least one initial image within an ordered sequence of images stored in a memory. The operations further include detecting at least one subsequent position of the object in at least one subsequent image within the ordered sequence of images. The operations further include estimating one or more intermediate positions of the object in one or more intermediate images within the ordered sequence of images between the initial image and the subsequent image based on the initial position and the subsequent position.

Implementations can include any, all, or none of the following features. The operations can further include blurring the object at the initial position in the initial image, the intermediate positions in the intermediate images, and the subsequent position in the subsequent image.

The details of one or more implementations are set forth in the accompanying drawings and the description below. Other features and advantages will be apparent from the description and drawings, and from the claims.

DETAILED DESCRIPTION

This document describes systems and techniques for detecting one or more objects in an ordered sequence of images, such as video. At least one instance of a particular type of object, such as a person's face, is detected in multiple ones of the images based on a comparison of features in the images to previously identified features for the type of object, such as previously identified facial features. One or more other instances of the object in the ordered sequence of images are then estimated based on the detected instances of the object. In some implementations, a location and/or size of the object within an image can be estimated even though the object may be obscured and/or in a different orientation than an orientation of the object in the detected instances. Operations can then be performed on the detected and estimated instances of the object, such as an operation to blur instances of a face object or a license plate object to protect an identity and/or personal information of a person.

Figure 1:
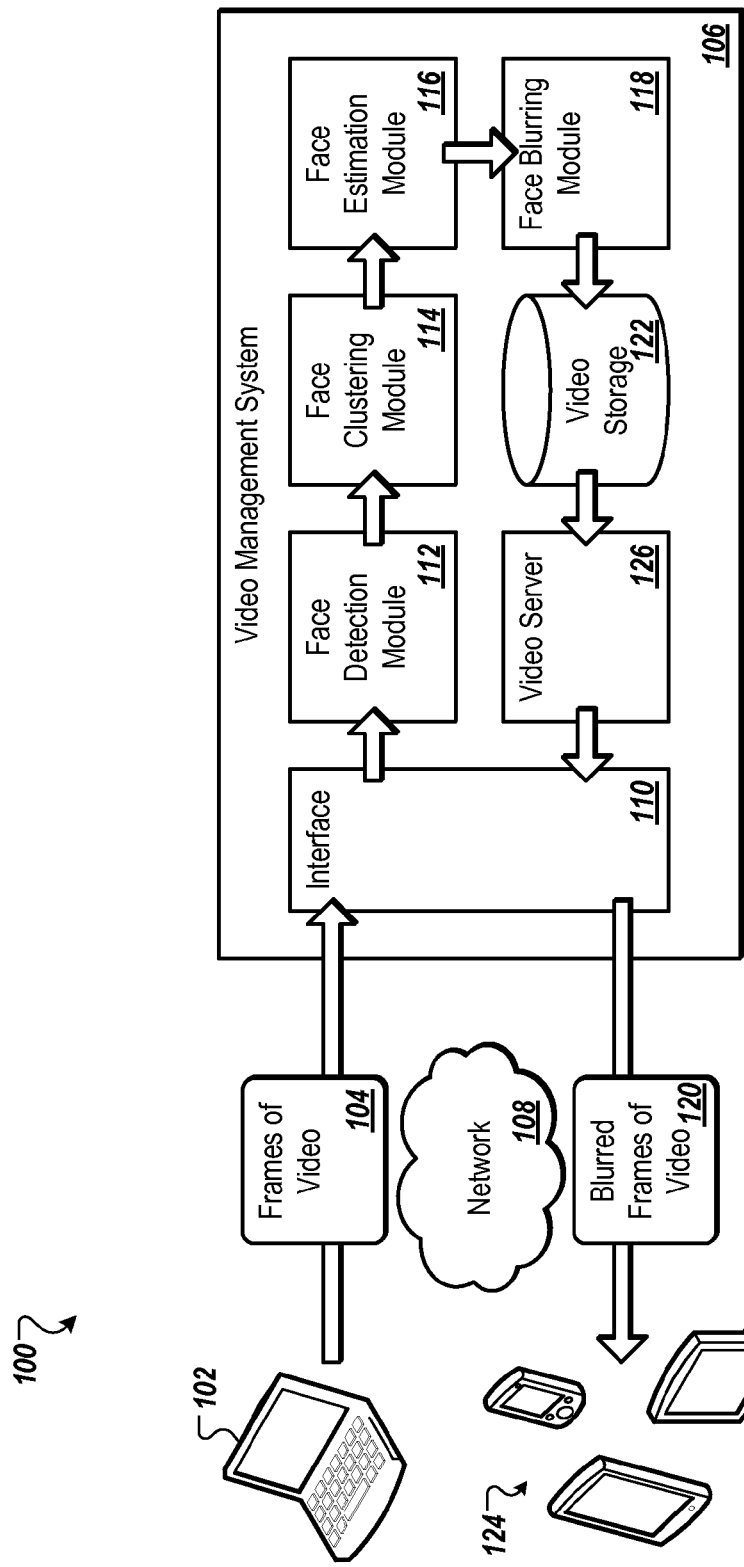
FIG. 1 is a schematic diagram that shows an example of a system for detecting one or more objects, such as faces, in an ordered sequence of images, such as video.

FIG. 1 is a schematic diagram that shows an example of a system 100 for detecting one or more objects, such as faces, in an ordered sequence of images, such as video. The system 100 detects positions and/or sizes of instances of faces in the video using face detection. The video also includes other instances of faces that may not be detected by the face detection, such as instances where a face is obscured by another object and/or where a face is in a profile view. The system 100 can use the detected positions and/or sizes of the instances of faces to estimate positions and/or sizes of the other instances of faces.

The system 100 includes a computing device 102 that sends multiple frames of video 104 to a video management system 106 over a network 108. The computing device 102 can include, for example, a mobile device such as laptop or smart phone, or a desktop computing device. The network 108 can include, for example, a local network and/or one or more of the computing devices that make up the Internet. The video management system 106 can be implemented using one or more computing devices. Each of the components within the video management system 106 can be implemented in combination with one or more of the other components, for example, at a same computing device or at separate computing devices.

The video management system 106 receives the frames of video 104 through an interface 110. The interface 110 provides communication between the video management system 106 and computing devices on the network 108. The interface 110 can include hardware, such as a wired and/or wireless connection to the network 108. The interface 110 can also provide a user interface to the computing device 102, such as a web page for uploading the frames of video 104 to the video management system 106. The interface 110 can also provide a user interface to the computing device 102 for making requests to edit the frames of videos 104, such as a request from a user at the computing device 102 to detect and blur one or more faces within the frames of video 104.

In response to a request to detect and/or blur faces in the frames of video 104, the interface 110 provides the frames of video 104 to a face detection module 112. Alternatively, the interface 110 can automatically provide the frames of video 104 to the face detection module 112, for example, in response to receiving the frames of video 104. The face detection module 112 applies a face detection algorithm to the frames of video 104. For example, the face detection module 112 can divide each of the frames of video 104 into features, such as by detecting edges between different areas of brightness and/or focal blur. The face detection module 112 can then compare each of the features from the frames of video 104 to a database of facial features. The database can include faces and/or features within faces that represent examples and/or models of faces. The examples and/or models of faces can be manually selected, for example, from images. If the face detection module 112 determines that one or more features from one of the frames of video 104 are similar (e.g., correspond by at least a threshold degree) to one or more facial features in the database, then the face detection module 112 determines that the features from the frame of video include a face.

The face detection module 112 also detects one or more other instances of faces in the frames of video 104 and provides data that describes the detected faces to a face clustering module 114. For example, the face detection module 112 can detect at least one initial instance of a face within at least one initial frame of video and at least one subsequent instance of the face within at least one subsequent frame of video. The subsequent frame is located, chronologically, after the initial frame in the sequence of the frames of video 104. The face clustering module 114 compares the instances of faces across the frames of video 104 to determine which ones of the instances of faces likely represent the same face. Each cluster includes the instances of faces that likely represent the same face.

The face clustering module 114 then provides data that describes the clusters of faces to a face estimation module 116. The face estimation module 116 estimates positions and/or sizes of one or more other instances of at least one face based on a cluster of instances for the face.

In some implementations, the face estimation module 116 can perform a linear interpolation between at least one initial instance of the face and at least one subsequent instance of the face to estimate the positions and/or sizes of one or more intermediate instances of a face. The face clustering module 114 determines that the initial and subsequent instances of the face likely represent the same face, and identifies one or more intermediate frames (between the initial frame(s) and subsequent frame(s)) that do not include detected instances of the face. The face estimation module 116 then estimates the positions of each one of the intermediate instances of the face within a corresponding intermediate frame of video between the initial frame of video and the subsequent frame of video.

In an example of linear interpolation with one intermediate instance of the face, the face estimation module 116 can place the position of the intermediate instance in the intermediate frame horizontally and/or vertically halfway between the position of the initial instance in the initial frame and the position of the subsequent instance in the subsequent frame. The face estimation module 116 can also assign a size to the intermediate instance that is halfway between a size of the face in the initial instance and a size of the face in the subsequent instance.

In an example of linear interpolation with multiple intermediate instances of the face, the face estimation module 116 can allocate the distance between the position of the initial instance in the initial frame and the position of the subsequent instance in the subsequent frame evenly among the intermediate instances in corresponding ones of the intermediate frames. The face estimation module 116 can also allocate the change in size between the initial instance and the subsequent instance evenly among the intermediate instances.

In some implementations, the face estimation module 116 can perform a polynomial interpolation and/or spline interpolation (e.g., a piecewise linear and/or polynomial interpolation) between one or more initial instances of the face and one or more subsequent instances of the face to estimate positions and/or sizes of the intermediate instances of the face. The face estimation module 116 uses the initial instances and the subsequent instances to generate a polynomial and/or set of polynomials (in the case of spline interpolation) that defines the position and/or size of the face within each intermediate frame of video as a function of the order of the intermediate frame within the sequence of video. The face estimation module 116 then uses the order of each intermediate frame in the sequence of video to estimate the positions and/or sizes of the corresponding intermediate instances of the face based on the polynomial and/or set of polynomials.

In some implementations, the face estimation module 116 includes up to a threshold number of estimated instances of the face in intermediate frames (e.g., the face estimation module 116 will not perform face estimation if the number of intermediate frames is above a threshold). For example, if the face estimation module 116 determines that the intermediate frames include more than the threshold number of frames, then the face estimation module 116 does not estimate positions and/or sizes of the face for the intermediate frames. The face estimation module 116 can base the threshold number of frames on a threshold amount of time, such as such as a few seconds (e.g., about one, two, or three seconds) of frames between the initial frame and the subsequent frame. The interface 110 can, in some implementations, provide a user interface to the computing device 102 with which a user can input the threshold amount of time or the threshold number of frames to be used for intermediate frames.

In some implementations, if the face estimation module 116 determines that the estimated position of the face in an intermediate frame moves by more than a threshold amount across the frame (e.g., a particular fraction of the height and/or width of the frame) as compared to an instance of the face in a preceding and/or following frame, then the face estimation module 116 refrains from estimating the position for the intermediate frame. For example, the face estimation module 116 can determine that an estimated position moves the face by more than about, e.g., one fifth, one tenth, or one twentieth of either the width or height of the frame between the initial frame and a following intermediate frame, then the face estimation module 116 does not estimate the position of the face for the intermediate frame.

In some implementations, the face estimation module 116 determines that the intermediate frames each include one or more features that partially resemble a face and/or partially resemble a particular face in a cluster. For example, as a result of dividing the frames into features and comparing the features from the frames to existing facial features, the face detection module 112 can assign a score to each set of features from the images. The score indicates how closely the features match the facial features, with a higher score indicating a closer match than a lower score. If the face detection module 112 determines that the score for a set of features in an image is at least a threshold level for detection, then the face detection module 112 identifies the set of features as a face and provides information describing the face to the face clustering module 114. If the score for the set of features is less than the high threshold level for detection but above a lower threshold for partial detection, then the face detection module 112 can identify the frame as a candidate for estimation. Accordingly, the face estimation module 116 estimates the position and/or size of the face in the frame.

In some implementations, the face estimation module 116 can perform an extrapolation on the initial instances and/or the subsequent instances of a face in the frames of video 104 to estimate positions of additional instances of the face before the initial instances and/or after the subsequent instances. The face estimation module 116 can use the position and/or size of a face in a first of the initial frames as the corresponding position and/or size for additional instances of the face in additional frames before the first of the initial frames. In addition, the face estimation module 116 can use the position and/or size of a face in a last of the subsequent frames as the corresponding position and/or size for additional instances of the face in additional frames after the last of the subsequent frames.

In another example of extrapolation, the face estimation module 116 can use two or more of the initial instances and the subsequent instances to identify one or more equations that can be used to extrapolate the position and/or size of the face to additional frames of the video before the initial frames and/or after the subsequent frames. For example, the face estimation module 116 can identify a straight line (e.g., represented by an equation with a degree of one) that represents the position of the face in the additional frames based on the positions of at least two of the detected faces in the initial and/or subsequent frames. Alternatively, the face estimation module 116 can identify a curved line (e.g., represented by a polynomial equation with a degree greater than one) that represents the positions of the face in the additional frames based on the positions of more than two of the detected faces in the initial and/or subsequent frames. Similarly, the face estimation module 116 can identify a straight or curved line that represents the sizes of the face in the additional frames based on the sizes of the face in two or more than two of the detected faces in the initial and/or subsequent frames In some implementations, the face estimation module 116 extrapolates positions of faces in up to a threshold amount of additional frames. For example, the face estimation module 116 can extrapolate up to a fixed number of additional frames before the initial frames and/or after the subsequent frames. In another example, the face estimation module 116 can extrapolate up to a number of additional frames before the initial frames and/or after the subsequent frames that is based on a threshold amount of time, such as a few seconds (e.g., about one, two, or three seconds) of additional frames before the initial frames and/or after the subsequent frames. The interface 110 can, in some implementations, provide a user interface to the computing device 102 with which a user can input the threshold amount of time to be used for additional frames.

In some implementations, the face estimation module 116 or another module detects boundaries between scenes in the frames of video 104. A scene boundary can include, for example, a cut away from one point of view in a scene to another point of view in the same scene, or from one scene to a completely different scene. The face estimation module 116 can cut off or truncate estimation of faces at the scene boundary so that the estimation does not occur across the detected scene boundary. For example, in addition to the threshold number of frames, the face estimation module 116 can end the estimation of faces in the additional frames before the threshold number of frames is encountered if a scene boundary is reached.

In some implementations, the face estimation module 116 can receive a user input (e.g., from the computing device 102 through the interface 110) that manually specifies the position and/or size of one or more faces in the frames of video 104. For example, the faces may be outside the thresholds for detection, clustering, and/or estimation described above. Alternatively, the manually specified faces can be provided to the face detection module 112 and/or the face clustering module 114, for example, to be added to a particular cluster of faces.

The face estimation module 116 provides data describing the detected faces in the initial and subsequent frames, the estimated faces in the intermediate and/or additional frames, and any manually specified faces in the frames of video 104 to a face blurring module 118. The face blurring module 118 applies a blurring operation to the portions of the frames that include detected and estimated faces. The blurring operation obscures the face (or other type of object being detected and estimated), for example, to protect the identity of the person in the frames and/or the person's personal information.

In some implementations, the face blurring module 118 uses a multi-step process to blur the faces. First, the face blurring module 118 can pixelate or reduce the resolution of the portion of each frame that includes a face. For example, the face blurring module 118 can replace a block of pixels, such as a block that is sixteen by sixteen pixels, with a single color that includes an average of the colors for the block or the color from a particular one of the pixels in the block. Next, the face blurring module 118 adds noise to the portions of each frame that include faces. Noise can include, for example, random or pseudo-random variations in brightness and/or color. Then, the face blurring module 118 blurs the portions of each frame that include faces. Blurring can include, for example, applying a box blur and/or Gaussian blur. Finally, the face blurring module 118 can add additional noise to the portions of each frame that include faces.

The face blurring module 118 then stores multiple blurred frames of video 120 in a video data storage 122. One or more computing devices 124, such as mobile computing devices (e.g., laptops or smart phones) or desktop computing devices, may send requests to the video management system 106 for the blurred frames of video 120 using the interface 110 or another interface. The interface 110 provides the requests to a video server 126. The video server 126 then retrieves the blurred frames of video 120 from the video data storage 122. The video server 126 then provides the blurred frames of video 120 to the computing devices 124 through the interface 110 over the network 108. In some implementations, the face blurring module 118 and/or the video server 126 provide the blurred frames of video 120, for example, to the computing device 102 in real-time.

In some implementations, the video management system 106 performs one or more of the operations of detecting, clustering, estimating, and blurring on a low quality copy of the video and a high quality copy of the video. The high quality copy of the video can include, for example, the frames of video 104 originally uploaded by the user from the computing device 102. The video management system 106 transcodes the frames of video 104 into low quality video, for example, by decreasing the resolution of each frame and/or the number of frames per second. The video management system 106 can then perform operations, such as detecting, clustering, and blurring, on the low quality video in a shorter amount of time that the high quality video and therefore more quickly provide a preview of changes being made to the user at the computing device 102. The video management system 106 can then perform the operations on the high quality video at a later time and/or in the background.

While shown in FIG. 1 as two separate systems (e.g., the computing device 102 and the video management system 106), alternatively, one or more components of the video management system 106 can be included within the computing device 102. For example, the computing device 102 can include one or more of the interface 110, the face detection module 112, the face clustering module 114, the face estimation module 116, the face blurring module 118, the video data storage 122, and the video server 126. In some implementations, the computing device 102 can include a non-transitory computer readable storage medium that stores instructions which when executed by a processing device at the computing device 102, cause the processing device to perform one or more of the operations previously described with respect to the components of the video management system 106.

Figure 2:
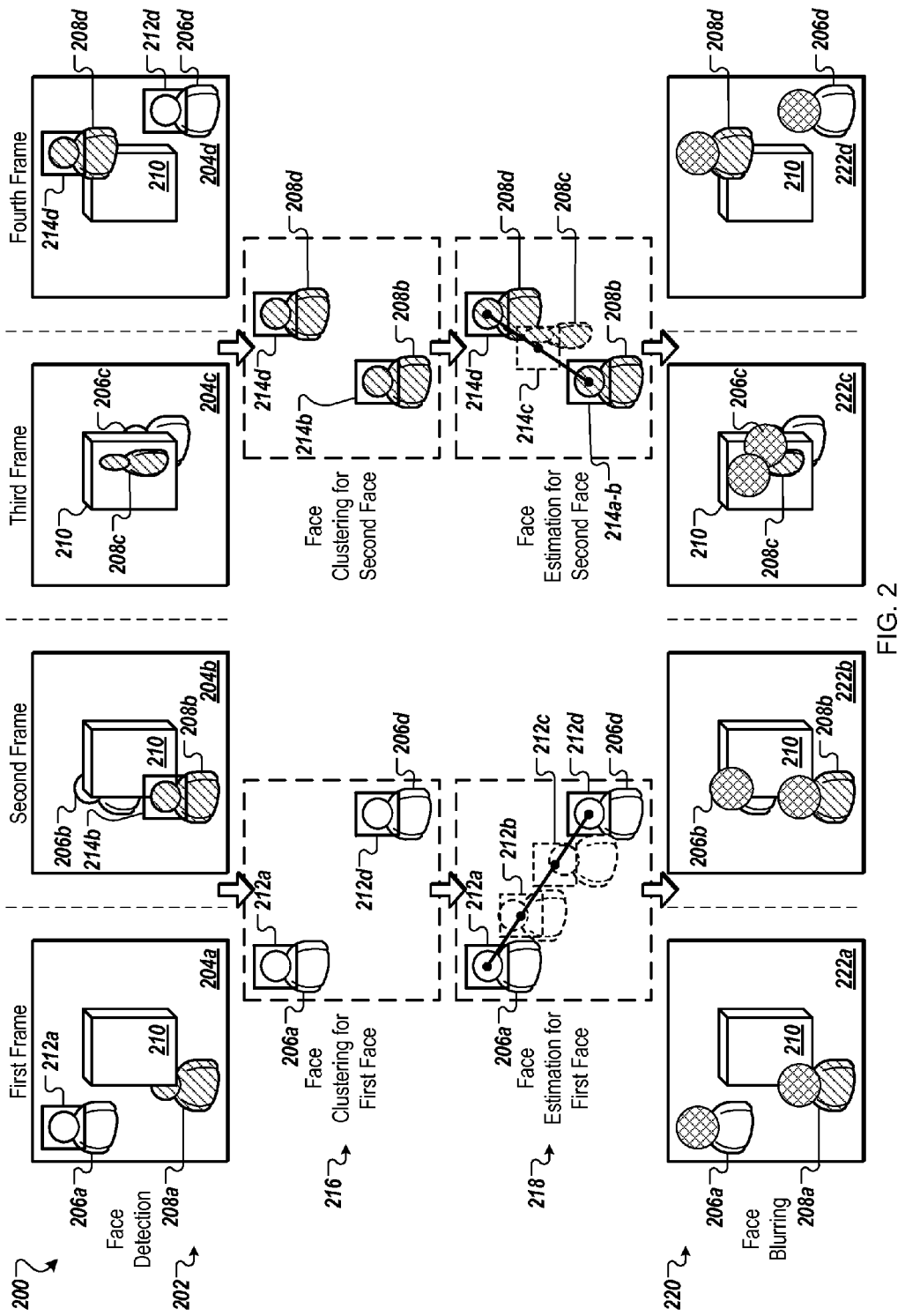
FIG. 2 is a schematic diagram that shows an example of detecting one or more objects in an ordered sequence of images.

FIG. 2 is a schematic diagram 200 that shows an example of detecting one or more objects, such as faces, in an ordered sequence of images, such as video. A first row 202 in the schematic diagram 200 shows multiple frames of video 204a-d representing a face detection operation. The frames of video 204a-d include multiple instances 206a-d of a first person and multiple instances 208a-d of a second person. The frames of video 204a-d also include an object 210 that obstructs a view of the first instance 208a of the second person and the second and third instances 206b-c of the first person. In addition, the third instance 208c of the second person is in a profile orientation that obscures the face of the second person.

Accordingly, the face detection module 112 detects a face 212a in the first frame of video 204a, a face 214b in the second frame of video 204b, no faces in the third frame of video 204c, and multiple faces 212d and 214d in the fourth frame of video 204d. The face detection module 112 then provides the detected faces to the face clustering module 114.

As shown in a second row 216, the face clustering module 114 compares the detected faces and determines that the face 212a in the first frame of video 204a and the face 212d in the fourth frame of video 204d represent the same person (e.g., the first person). The face clustering module 114 also determines that the face 214b in the second frame of video 204b and the face 214d in the fourth frame of video 204d represent the same person (e.g., the second person who is different than the first person). The face clustering module 114 provides the clusters of faces to the face estimation module 116.

As shown in a third row 218, the face estimation module 116 performs a linear interpolation between the face 212a from the first frame of video 204a and the face 212d from the fourth frame of video 204d to estimate multiple faces 212b-c for the first person from the second and third frames of video 204b-c, respectively. The face estimation module 116 performs a linear interpolation between the face 214b from the second frame of video 204a and the face 214d from the fourth frame of video 204d to estimate a face 214c for the second person from the third frame of video 204c. The face estimation module 116 can also estimate a position and/or size of a face for the instance 208a of the second person in the first frame of video 204a as the position and/or size of the face 214b from the second frame of video 204b. The face estimation module 116 provides data to the face blurring module 118 that describes the detected and estimated faces.

As shown in a fourth row 220, the face blurring module 118 blurs a portion of each of the frames of video 204a-d corresponding to the detected and estimated faces to generate multiple blurred frames of video 222a-d, respectively. The face blurring module 118 can then store the blurred frames of video 222a-d in the video data storage 122. Also, the video server 126 can provide the blurred frames of video 222a-d to the computing device 102 and/or the computing devices 124.

Figure 3:
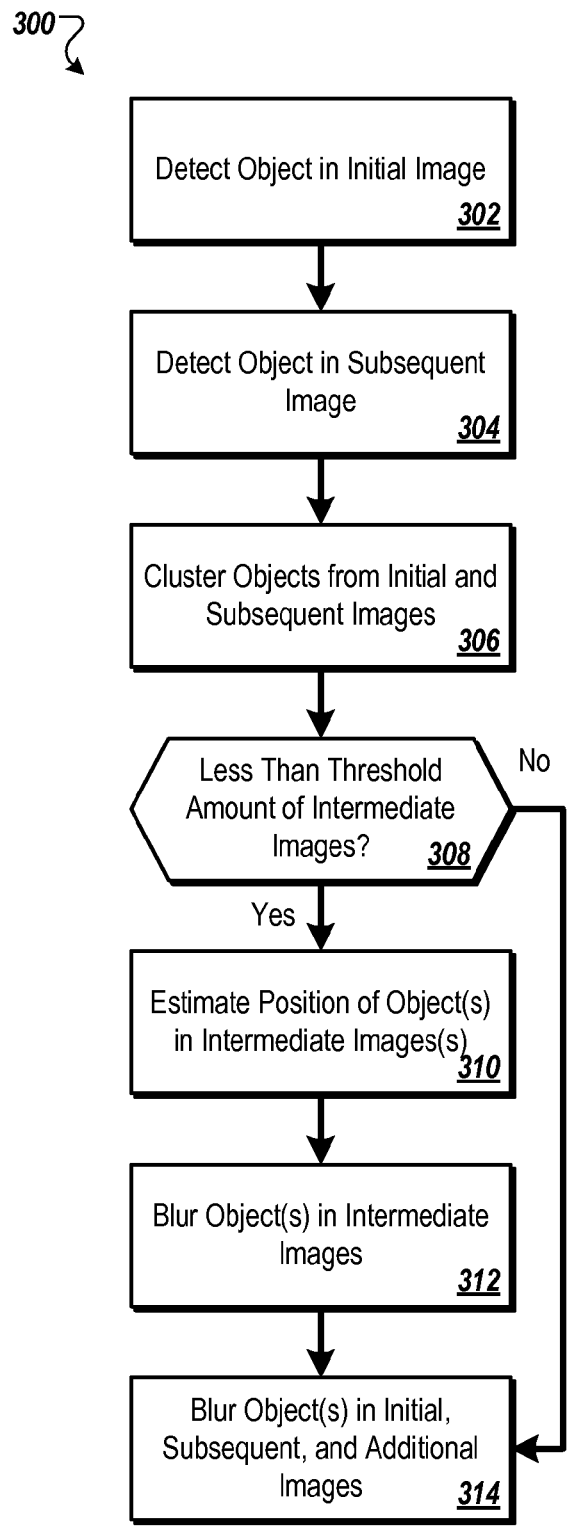
FIG. 3 is flow chart that shows an example of a process for detecting one or more objects in an ordered sequence of images.

FIG. 3 is flow chart that shows an example of a process 300 for detecting one or more objects, such as faces, in an ordered sequence of images, such as video. The process 300 may be performed, for example, by a system such as the system 100. For clarity of presentation, the description that follows uses the system 100 as an example for describing the process 300. However, another system, or combination of systems, may be used to perform the process 300.

The process 300 begins with detecting (302) at least one initial position of a first object of a specific type in at least one initial image within an ordered sequence of images. For example, the face detection module 112 can detect the face 212a in the first frame of video 204a and the face 214b in the second frame of video 204b.

The process 300 also detects (304) at least one subsequent position of the first object in at least one subsequent image within the ordered sequence of images. For example, the face detection module 112 can detect the faces 212d and 214d in the fourth frame of video 204d.

The process 300 can include clustering (306) the initial position and the subsequent position of the first object together. For example, the face clustering module 114 can cluster the faces 212a and 212d from the first and fourth frames of video 204a and 204d together, and the faces 214b and 214d from the second and fourth frames of video 204b and 204d together.

If the process 300 determines (308) that the ordered sequence of images includes less than a threshold number of intermediate images between the initial image and the subsequent image, then the process 300 estimates (310) one or more intermediate positions of the object in the intermediate images and blurs (312) the object at the intermediate positions in the intermediate images. For example, the face estimation module 116 can determine that the frames of video 204b-c between the face 212a of the first person in the first frame of video 204a and the face 212d of the first person in the fourth frame of video 204d include less than a threshold number of frames that corresponds, for example, to two seconds of video. In another example, the face estimation module 116 can determine that the frame of video 204c between a face 214a of the second person in the second frame of video 204b and the face 214d of the second person in the fourth frame of video 204d includes less than a threshold number of frames that corresponds, for example, to two seconds of video.

The process 300 blurs (314) the object at the initial position in the initial image and the subsequent position in the subsequent image. For example, the face blurring module 118 can blur the faces 212a-d of the first person and the faces 214a-d of the second person to generate the blurred frames of video 222a-d. In addition, the face blurring module 118 and/or the video server 126 can buffer the video for at least the threshold amount of time (e.g., two seconds) and provide the blurred frames of video 222a-d for presentation at the computing device 102 and/or the computing devices 124. Accordingly, the face blurring module 118 and/or the video server 126 can blur the faces in real-time with a delay due to buffering the video for at least the threshold amount of time.

Figure 4:
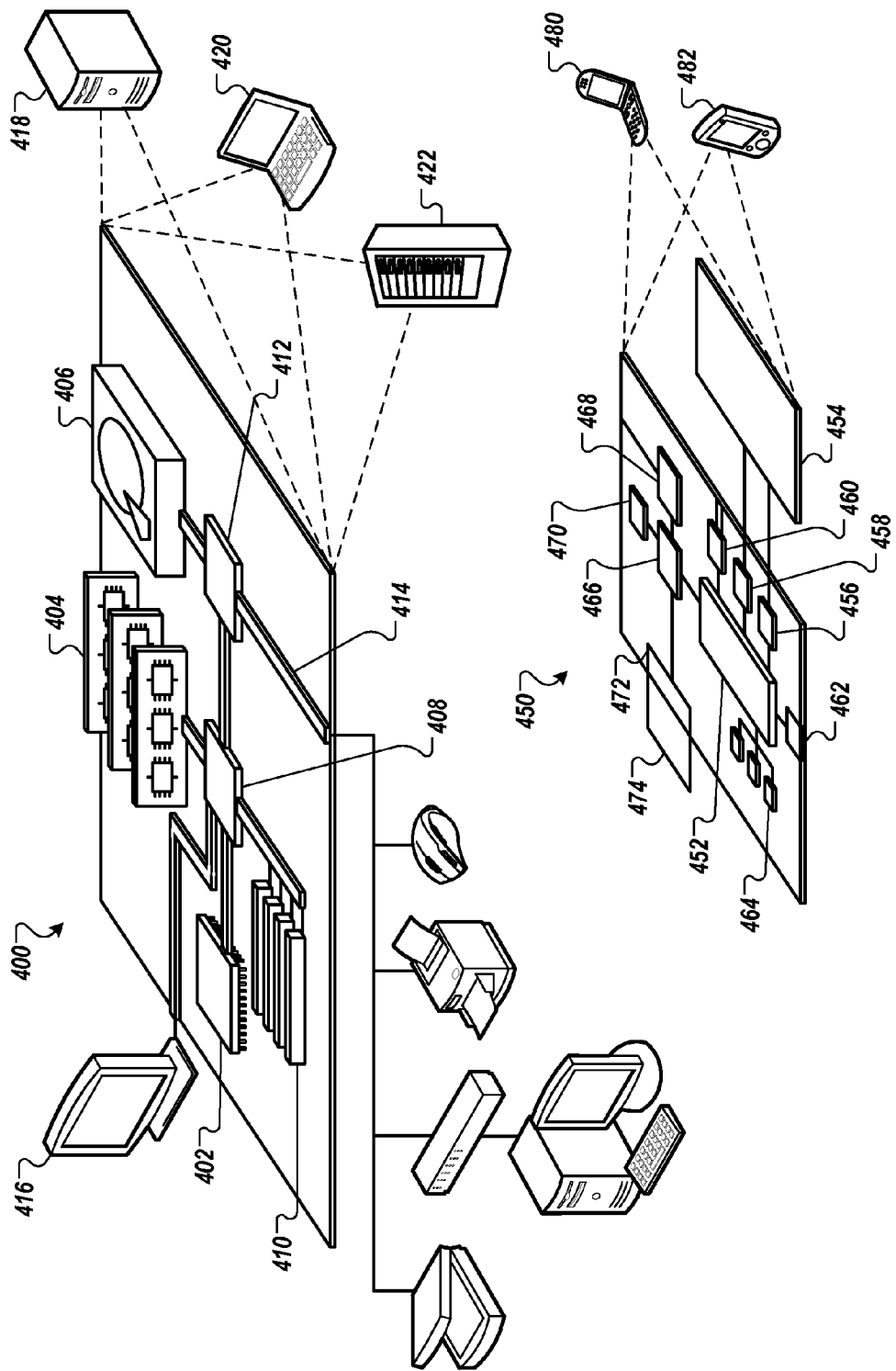
FIG. 4 is a schematic diagram that shows an example of a computing device and a mobile computing device.

FIG. 4 is a schematic diagram that shows an example of a computing device 400 and an example of a mobile computing device 450 that may be used to implement the video management system 106, the components within the video management system 106, the computing device 102, and the computing devices 124, as well as the methods described in this document, as either a client or as a server or plurality of servers. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart phones, and other similar computing devices. Additionally the computing device 400 or the mobile computing device 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations.

A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 418, or multiple times in a group of such servers. In addition, it may be implemented in a personal computer such as a laptop computer 420. It may also be implemented as part of a rack server system 422. Alternatively, components from the computing device 400 may be combined with other components in a mobile device (not shown), such as the mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. Additionally, the processor 452 may be implemented using any of a number of architectures. For example, the processor 452 may be a CISC (Complex Instruction Set Computers) processor, a RISC (Reduced Instruction Set Computer) processor, or a MISC (Minimal Instruction Set Computer) processor. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. The memory 464 may include, for example, flash memory and/or NVRAM memory (non-volatile random access memory).

An expansion memory 474 may also be provided and connected to the mobile computing device 450 through an expansion interface 472, which may include, for example, a SIMM (Single In-Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a secure manner.

In some implementations, a computer program product is tangibly embodied in an information carrier. The computer program product contains instructions that, when executed, perform one or more methods, such as those described above. The information carrier is a computer- or machine-readable medium, such as the memory 464, the expansion memory 474, or memory on the processor 452. In some implementations, the computer program product may be received, for example, over the transceiver 468 or the external interface 462 and stored in the computer- or machine-readable medium.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
   detecting positions of instances of an object of a specific type within an ordered sequence of images stored in a memory, wherein the ordered sequence of images comprises a video, and wherein the positions of the instances of the object comprise at least one initial position of at least one initial instance of the object in at least one initial image within the ordered sequence of images and at least one subsequent position of at least one subsequent instance of the object in at least one subsequent image within the ordered sequence of images after the initial image in the ordered sequence of images;
   determining that the ordered sequence of images comprises a number of intermediate images between the initial image and the subsequent image that is within a first threshold number of images, wherein the first threshold number of images is based on a first threshold amount of time;
   estimating, by one or more processing devices, one or more intermediate positions of one or more intermediate instances of the object in the intermediate images based on the initial position and the subsequent position in response to determining that the number of intermediate images is within the first threshold number of images;
   buffering the video for at least the first threshold amount of time;

performing an operation on the initial instance, the intermediate instances, and the subsequent instance of the object in real-time with a delay due to buffering the video for at least the first threshold amount of time; and providing the video for presentation.

2. The method of claim 1, wherein estimating the intermediate positions comprises calculating a linear interpolation of the intermediate positions between the initial position and the subsequent position.

3. The method of claim 1, wherein performing the operation comprises blurring the object at the initial position in the initial image, the intermediate positions in the intermediate images, and the subsequent position in the subsequent image.

4. The method of claim 3, wherein blurring the object comprises lowering a resolution of the object at the initial position in the initial image, the intermediate positions in the intermediate images, and the subsequent position in the subsequent image.

5. The method of claim 1, further comprising determining, based on the initial position and the subsequent position, that the object moves across the intermediate images within a threshold amount and, in response, estimating the intermediate positions.

6. The method of claim 1, further comprising estimating one or more additional positions of the object in one or more additional images within the ordered sequence of images, wherein the additional images are at one or more of before the initial image or after the subsequent image, and wherein the additional positions of the object in ones of the additional images before the initial image are based at least on the initial position and the additional positions of the object in ones of the additional images after the subsequent image are based at least on the subsequent position.

7. The method of claim 6, wherein the ones of the additional images before the initial image and the ones of the additional images after the subsequent image include up to a second threshold number of images.

8. The method of claim 7, wherein the second threshold number of images is based on a second threshold amount of time.

9. The method of claim 1, wherein detecting, determining, estimating, buffering, performing, and providing are performed by a server computing system, and wherein providing the video comprises providing the video from the server computing system to a client computing device.

10. The method of claim 1, wherein detecting determining, estimating, buffering, performing, and providing are performed by a client computing device.

11. A system comprising:
a data storage to store an ordered sequence of images; and
one or more processing devices to:
detect positions of instances of objects of a specific type within the ordered sequence of images, wherein the ordered sequence of images comprises a video;
cluster the instances for an object among the objects, wherein the positions of the instances of the object comprise at least one initial position of at least one initial instance of the object in at least one initial image within the ordered sequence of images and at least one subsequent position of at least one subsequent instance of the object in at least one subsequent image within the ordered sequence of images after the initial image in the ordered sequence of images;
determine that the ordered sequence of images comprises a number of intermediate images between the initial image and the subsequent image that is within a first threshold number of images, wherein the first threshold number of images is based on a first threshold amount of time;
estimate one or more intermediate positions of one or more intermediate instances of the object in the intermediate images based on the initial position and the subsequent position in response to the determination that the number of intermediate images is within the first threshold number of images;
buffer the video for at least the first threshold amount of time;
perform an operation on the initial instance, the intermediate instances, and the subsequent instance of the object in real-time with a delay to buffer the video for at least the first threshold amount of time; and
providing the video for presentation.

12. The system of claim 11, wherein the processing devices estimate the intermediate positions by calculating a linear interpolation of the intermediate positions between the initial position and the subsequent position.

13. The system of claim 11, wherein the processing devices are to perform the operation by blurring the object at the initial position in the initial image, the intermediate positions in the intermediate images, and the subsequent position in the subsequent image.

14. The system of claim 13, wherein the processing devices blur the object by lowering a resolution of the object at the initial position in the initial image, the intermediate positions in the intermediate images, and the subsequent position in the subsequent image.

15. The system of claim 11, wherein the processing devices are further to determine, based on the initial position and the subsequent position, that the object moves across the intermediate images within a threshold amount and, in response, estimate the intermediate positions.

16. The system of claim 11, wherein the data storage and the processing devices are at a server computing system, and wherein the processing devices are to provide the video by providing the video from the server computing system to a client computing device.

17. The system of claim 11, wherein the processing devices are further to estimate one or more additional positions of the object in one or more additional images within the ordered sequence of images, wherein the additional images are at one or more of before the initial image or after the subsequent image, and wherein the additional positions of the object in ones of the additional images before the initial image are based at least on the initial position and the additional positions of the object in ones of the additional images after the subsequent image are based at least on the subsequent position.

18. The system of claim 17, wherein the ones of the additional images before the initial image and the ones of the additional images after the subsequent image include up to a second threshold number of images.

19. The system of claim 18, wherein the second threshold number of images is based on a second threshold amount of time.

20. A non-transitory computer readable storage medium having instructions stored therein that, when executed by one or more processing devices, cause the processing devices to perform operations comprising:
detecting positions of instances of an object of a specific type within an ordered sequence of images stored in a memory, wherein the ordered sequence of images comprises a video, and wherein the positions of the instances of the object comprise at least one initial position of at least one initial instance of the object in at least one initial image within the ordered sequence of images and at least one subsequent position of at least one subsequent instance of the object in at least one subsequent image within the ordered sequence of images after the initial image in the ordered sequence of images;

determining that the ordered sequence of images comprises a number of intermediate images between the initial image and the subsequent image that is within a first threshold number of images, wherein the first threshold number of images is based on a first threshold amount of time;

estimating, by the processing devices, one or more intermediate positions of one or more intermediate instances of the object in the intermediate images based on the initial position and the subsequent position in response to determining that the number of intermediate images is within the first threshold number of images;

buffering the video for at least the first threshold amount of time;

performing an operation on the initial instance, the intermediate instances, and the subsequent instance of the object in real-time with a delay due to buffering the video for at least the first threshold amount of time; and providing the video for presentation.

21. The computer readable storage medium of claim 20, wherein performing the operation comprises blurring the object at the initial position in the initial image, the intermediate positions in the intermediate images, and the subsequent position in the subsequent image.

22. The computer readable storage medium of claim 20, further comprising estimating one or more additional positions of the object in one or more additional images within the ordered sequence of images, wherein the additional images are at one or more of before the initial image or after the subsequent image, and wherein the additional positions of the object in ones of the additional images before the initial image are based at least on the initial position and the additional positions of the object in ones of the additional images after the subsequent image are based at least on the subsequent position.

23. The computer readable storage medium of claim 22, wherein the ones of the additional images before the initial image and the ones of the additional images after the subsequent image include up to a second threshold number of images, and wherein the second threshold number of images is based on a second threshold amount of time.

24. The computer readable storage medium of claim 20, wherein detecting, determining, estimating, buffering, performing, and providing are performed by a client computing device.

* * * * *